Oct. 26, 1926. 1,604,526
P. A. McCANDLESS
TUBE SPLICER
Filed Dec. 7, 1925
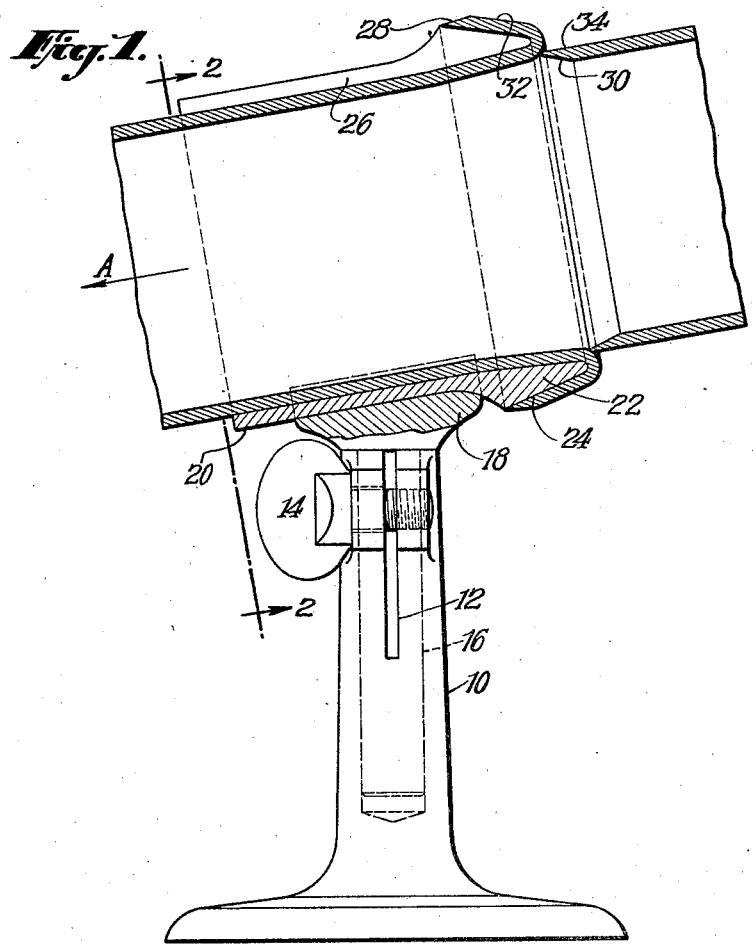
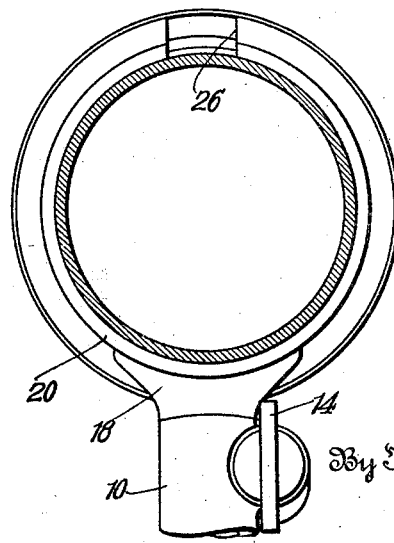
Inventors
Percival A. McCandles
By Their Attorney Patented Oct. 26, 1926.

1,604,526

UNITED STATES PATENT OFFICE.

PERCIVAL A. McCANDLESS, OF BUFFALO, NEW YORK, ASSIGNOR TO DUNLOP TIRE AND RUBBER CORPORATION OF AMERICA, OF BUFFALO, NEW YORK, A CORPORATION OF NEW YORK.

TUBE SPLICER.

Application filed December 7, 1925. Serial No. 73,562.

This invention relates to improved method and apparatus for splicing or joining together the ends of rubber tubes and while not limited thereto is particularly directed to the joining of inner tubes such as used for automobile tires. The invention relates to a quick method of joining the tube, as a necessary step prior to vulcanization. The invention will be apparent from the following specification when read in connection with the accompanying drawings in which—

Fig. 1 is a side elevation with parts broken away of the novel apparatus for carrying out my invention;

Fig. 2 is a section on line 2—2 of Fig. 1.

Referring first to the apparatus, 10 represents a suitable stand which is kerfed at 12 and provided with a clamp screw 14 by means of which the shank 16 of an adjustable supporting member 18 may be secured in any desired position. The supporting member carries a mandrel 20 which is substantially cylindrical except for the forward portion 22 which flares outwardly and is formed with a tapered or conical surface 24. A longitudinally extending slot 26 is formed in the mandrel for the purpose of permitting removal of the spliced tube as will hereinafter more fully appear.

In uniting or splicing the ends of the tube with the novel apparatus shown and according to my novel method, the ends of the tube are usually skived as at 28 and 30 and the surfaces 32 and 34 are suitably buffed and given one or more coats of cement, the cement preferably also extending over the skived portion 28 of the tube. One end of the tube—the end cemented on the inside—is now passed through the center opening of the mandrel or the slot and folded back over the bevelled surface 24 substantially as shown in Fig. 1. The opposite end of the tube is then grasped in the hand of the operator and brought up to the position shown. The edge of the entering end will adhere to the tacky cemented surface of the end folded back. Both ends are then moved simultaneously into the mandrel so as to cause the surface 32 to be folded over into contact with the surface 34. The joint is thus formed almost instantaneously.

The tapered surface of the mandrel will allow the folded tube end to slip readily off the mandrel on to the entering end, when the ends are drawn into the mandrel to form the joint. An advantage of stretching one end over the mandrel gives that end a uniform stretch so that when the joint is completed there is less tendency to break the joint or cause a buckle than is common with any other methods not giving uniform stretch.

The length of the bevelled surface 24 is designed to serve as a gauge to assist the operator in determining the length of tube stock to be turned back to form the cuff like portion which subsequently is folded over to form the overlap joint.

While I have described the particular apparatus used in great detail and referred specifically to certain sequence of steps, it is not to be understood that I am limited thereto as various changes may be made without departing from the invention as defined in the appended claims.

What I claim is:—

1. The method of splicing the ends of a tube which consists in applying a coat of adhesive to at least one of the surfaces to be joined, folding one end of the tube over a tubular mandrel to form a cuff-like overlap, bringing the other end of the tube into edge contact with the forward edge of the cuff-like portion, and pulling the contacting ends into the mandrel to strip the cuff portion from the exterior thereof and to overlap it with the adjacent end of the tube.

2. An apparatus of the character described for splicing the ends of a tube including a tubular mandrel having a longitudinal slot to permit removal of the tube, said mandrel having a tapered supporting surface at the end thereof over which the end of the tube is adapted to be folded and from which the tube can be readily stripped by an endwise pull.

3. An apparatus of the character described for splicing the ends of a tube including a tubular mandrel having a longitudinal slot to permit removal of the tube, said mandrel having a substantially continuous supporting surface at one end tapered for a distance substantially equal to the length of splice required so the tapered end serves as a gauge to indicate the amount of tube to be folded back on the mandrel to form a determined length of joint.

In witness whereof, I have hereunto signed my name.

PERCIVAL A. McCANDLESS.